June 16, 1931. W. H. RITTBERGER 1,809,867
SAUSAGE AND ROLL HEATER
Filed Jan. 2, 1930 2 Sheets-Sheet 2
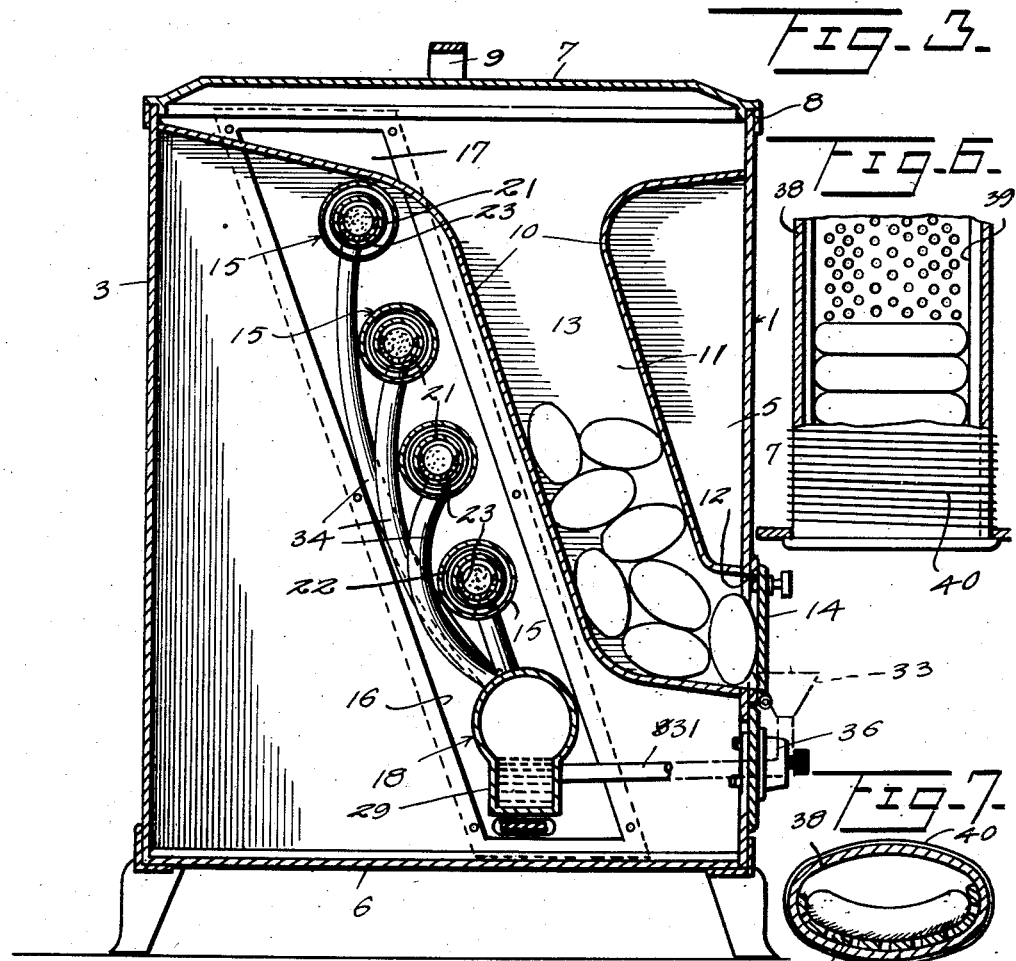
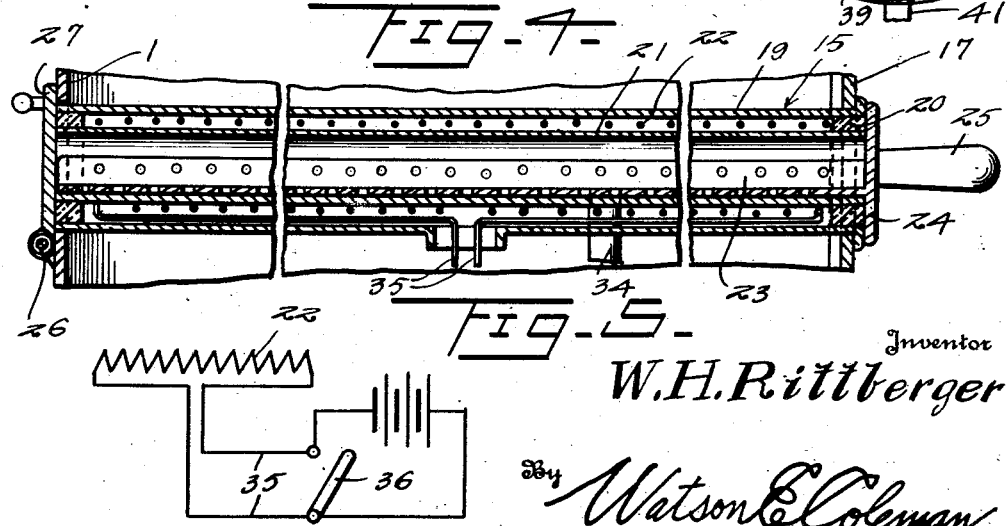
Inventor
W.H.Rittberger
By Watson E. Coleman
Attorney Patented June 16, 1931

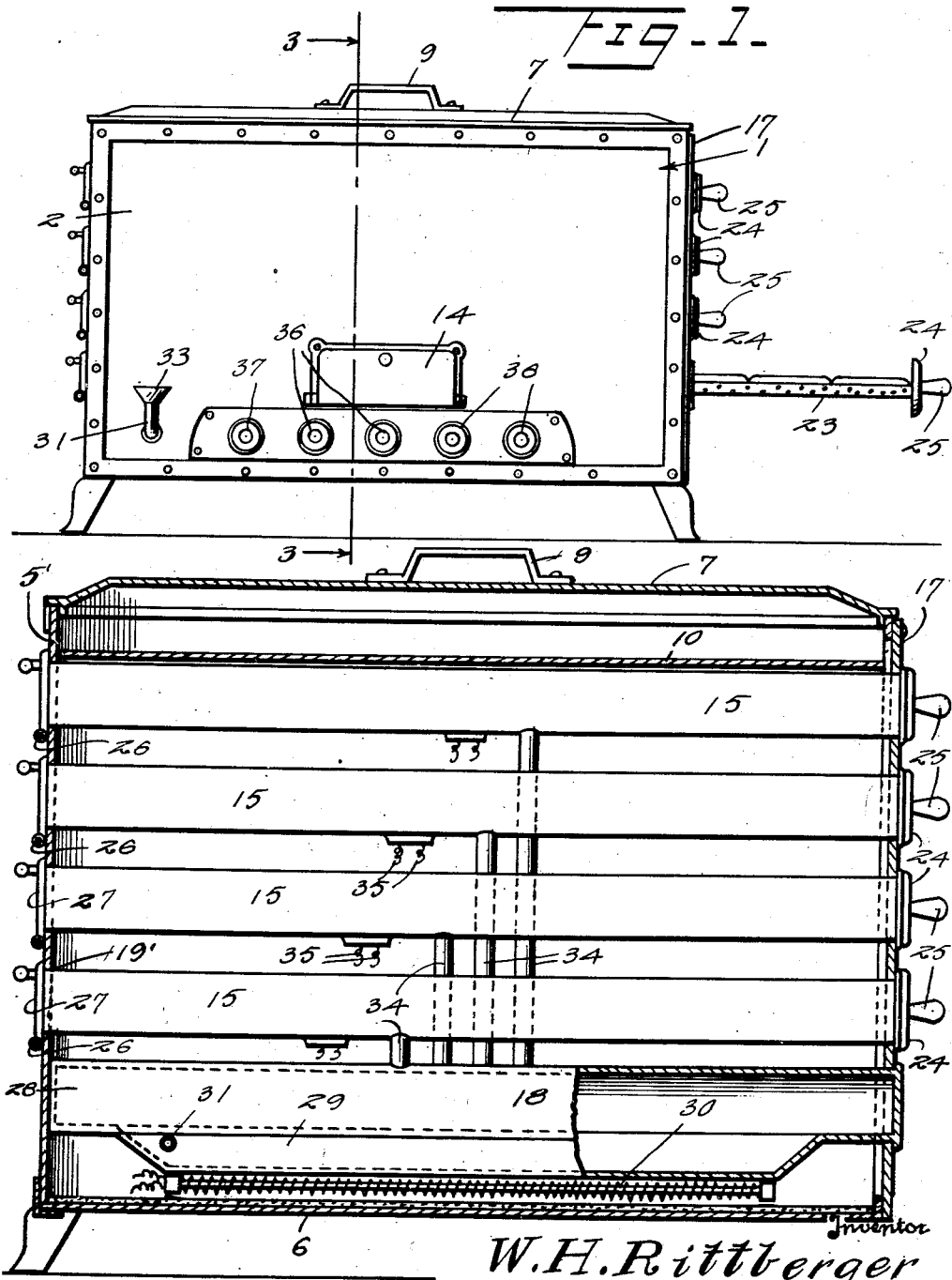

1,809,867

UNITED STATES PATENT OFFICE

WILLIAM H. RITTBERGER, OF GRANITE CITY, ILLINOIS

SAUSAGE AND ROLL HEATER

Application filed January 2, 1930. Serial No. 418,142.

This invention relates to improvements in store and lunchroom service apparatus and pertains particularly to an improved sausage and roll heating device.

The primary object of the present invention is to provide a device wherein sausage may be heated and kept in a heated condition ready for serving, without being exposed to the dust and dirt of the air as they are ordinarily in eating places where they are served and without becoming dried out and tough.

Another object of the invention is to provide means whereby the sausage may be constantly kept in a bath of steam so that they will be maintained in the proper moist condition.

Still another object of the invention is to provide a device of the above described character wherein a roll heating chamber is formed for keeping the usual long rolls in which sausages are served, in warm condition.

Other objects and advantages of the present invention will become apparent as the description of the same proceeds, and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in front elevation of the device embodying the present invention.

Figure 2 is a longitudinal sectional view through the same showing the sausage heating tubes in elevation and a portion of the steam generator in longitudinal section.

Figure 3 is a transverse sectional view taken on the line 3—3 of Figure 1.

Figure 4 is a longitudinal sectional view through one of the sausage heating and steaming tubes.

Figure 5 is a diagrammatic showing of the electric circuit for one of the heating tubes.

Figure 6 is a view partly in section and partly in elevation of a modified form of sausage heating tube.

Figure 7 is a cross-sectional view of the modified tube shown in Figure 6.

Referring more particularly to the drawings wherein like numerals of reference indicate corresponding parts throughout the several views, the numeral 1 indicates generally one form in which the sausage and roll heating device embodying the present invention may be provided, this form being a rectangular casing having the front and back walls 2 and 3 respectively, the end walls 4 and 5, the bottom wall 6 and the removable top 7, the latter being provided with a grooved edge portion 8 for the reception of the top edges of the front, back and end walls so that a tight fit between the same and the top may be obtained. Removal of the top 7 is facilitated through the provision of a handle 9.

Within the casing 1 a pair of inclined and spaced partitions 10 is provided for extension from end to end thereof and which, with the connecting end walls 11, converge at the lower part of the front wall 2 where a door opening 12 is provided through which rolls within the chamber 13 which is thus formed may be removed as desired. This door opening 12 is normally closed by the door 14 which may be held in such position by any form of spring operated hinge or the like.

As is shown in Figure 3 the roll heating chamber 13 is located in the forward part of the casing 1 so that a substantial area is left in the rear of the casing and through this area the sausage heating units extend from one end wall to the other. Each of these units is indicated as a whole by the numeral 15.

One end wall of the casing, as for example the wall 5, is provided with the longitudinally extending opening 16 over which a closure plate 17 is normally secured. This closure plate 17 carries all of the sausage heating units 15 as shown and in addition below these units it carries the steam generating device which is indicated as a whole by the numeral 18. The opposite end wall is provided with a series of apertures 19' through each of which the other end of a sausage heating unit 15 opens.

Each of the units 15 consists of an outer tubular casing 19 which has that end extended through and in contact with the plate or panel 17 secured thereto in any suitable manner as for example by welding or the like. Extending centrally through each tube 19 and suitably insulated therefrom by the surrounding end members 20 is an inner tube 21 about which an electric resistance coil 22 is wound.

Each end of the tube 21 is open and the end which extends through the panel 17 has slidably extended thereinto the apertured sausage tray 23 which, as shown, is of substantially semi-cylindrical formation, one end of this tray having the cover plate 24 thereon which, when the tray is extended into the heating tube 21 closes that end of the tube adjacent the panel 17. A handle 25 is attached to each cover plate 24 to facilitate its insertion and removal.

Each of the outer tubes 19 has its free end positioned in an opening 19' and the end wall 5 has pivotally mounted thereon as indicated at 26, adjacent each opening a swinging cover 27 which normally closes the end of the heating tube 21 in which the sausage heating tray 23 is located.

As before stated beneath the group of sausage heating units 15 is located a steam generator 18. This generator consists of an elongated tubular boiler 28 which has opening thereinto a water containing sump 29 beneath which is located an electric heating unit 30. The sump 29 has opening thereinto a feed water tube 31 which extends forwardly through the front wall 2 of the structure where it turns upwardly and terminates in a filling funnel 33.

Leading from the boiler 28 is a series of steam conducting tubes 34 each of which leads to one of the sausage heating units 15 passing through the outer casing 19 and through the inner casing 21 to discharge steam thereinto. The heating coils 22 of each of the sausage heating units 15 are connected by wires 35 with control switches 36 located at the front of the device, the heating unit 30 for the steam generator also having a control switch at the front of the device which switch may be indicated by the numeral 37.

In Figures 6 and 7 there is shown a slightly modified form of the sausage heating unit described in connection with the other figures. In the unit 15 the sausages are designed to be run lengthwise thereinto through the end of the heating tube covered by the door 27. With this construction the removal of a hot sausage and the insertion of the same between the halves of a split roll may be easily effected by drawing out the carrier 23 a distance equal to the length of a sausage and then partially rotating it so that the sausage will be emptied into the open roll which may be held therebeneath. In the modified form the heating casing shown and indicated by the numeral 38 is of elliptical cross-sectional design, the sausage carrier being semi-elliptical as shown, this carrier being indicated by the numeral 39. With this form of carrier the sausages may be laid side by side instead of end to end with the result that each of these heating units will be able to accommodate a great many more sausages than would the units 15. Each of these units is of course heated by a surrounding electric heating coil 40 and each also has opening thereinto under the carrier 39 a steam pipe 41 through which steam is injected into the heater so that the sausage in addition to being kept hot will be prevented from drying out.

From the foregoing description it will be readily appreciated that with a sausage heater of the character herein described a large number of these articles may be kept hot and ready to serve without being exposed to the dust and dirt normally present in the atmosphere, particularly in a public place like a restaurant where people are continually moving about and in addition to this the sausage when served will be soft and moist as it should be instead of partially dried out and tough as is frequently the case where the sausages are heated and kept hot on open iron grills.

Having thus described my invention, what I claim is:—

1. A sausage heater comprising a tube open at each end, shiftable means for closing one end of the tube, an open carrier of substantially the same length as the tube adapted to be extended thereinto from the other end, said carrier having an end plate formed to close the other end of the tube when in position therein, and means for heating the tube.

2. A sausage heater comprising a tube open at each end, shiftable means for closing one end of the tube, an open carrier of substantially the same length as the tube adapted to be extended thereinto from the other end, said carrier being formed to close the other end of the tube when in position therein, a heating element surrounding the tube, and means for introducing steam to the interior of the tube, said carrier being perforated to permit the steam to pass therethrough for contact with articles carried thereby.

3. A sausage heater comprising a casing, a plurality of tubular bodies extending through the casing and opening through opposite walls thereof, a second tubular body within each of the first mentioned bodies, each of said second bodies also opening through the said opposite walls, an elongated removable sausage carrier extended into each of said second tubular bodies and closing one end thereof, means for closing the other end of each of the tubular bodies, a heating element surrounding each of the second mentioned tubular bodies, a steam generator within the casing, and means for conducting steam from said generator to and introducing it into each of the second mentioned bodies.

4. A sausage heater comprising a casing, a plurality of tubular bodies extending through the casing and opening through opposite walls thereof, a second tubular body within each of the first mentioned bodies, each of said second bodies also opening through the said opposite walls, an elongated removable sausage carrier extended into each of said second tubular bodies and closing one end thereof, means for closing the other end of each of the tubular bodies, a heating element surrounding each of the second mentioned tubular bodies, a steam generator within the casing, means for conducting steam from said generator to and introducing it into each of the second mentioned bodies, and a removable plate forming a part of one of said opposite walls and carrying said steam generating means and the tubular bodies thereon.

5. A sausage heater comprising a casing, a plurality of tubular bodies extending through the casing and opening through opposite walls thereof, a second tubular body within each of the first mentioned bodies, each of said second bodies also opening through the said opposite walls, an elongated removable sausage carrier extended into each of said second tubular bodies and closing one end thereof, means for closing the other end of each of the tubular bodies, a heating element surrounding each of the second mentioned tubular bodies, a steam generator within the casing, and means for conducting steam from said generator to and introducing it into each of the second mentioned bodies, the closing means for the said other ends of the second mentioned tubular bodies being shiftable to permit of the insertion of sausage into the carriers.

6. A combined sausage and roll heater, comprising a casing having a chamber therein in the form of a hopper, the lower portion of said chamber opening through the front wall of the casing, said chamber being provided for the keeping of rolls in warm condition, a plurality of sausage heating units extending transversely through the casing adjacent said chamber each of said units comprising an outer tubular body, an inner tubular body and a perforated semi-cylindrical carrier positioned within the inner tubular body, said carrier being formed to close one end of the inner tubular body, a shiftable closure for the other end of the tubular body of each unit, a heating element for the inner tubular body of each unit, a steam generator disposed in the casing beneath said units, and means for conveying steam from said generator to the inner tubular body of each unit.

7. A device of the character described for heating articles of food, comprising an elongated body consisting of an inner and an outer wall, said inner and outer walls being in spaced relation, a heating element disposed between said walls, an article carrier comprising an elongated tray like body insertable into the first mentioned body from one end thereof and formed to close the end of the first mentioned body into which it is inserted, and means for introducing steam into the interior of the first mentioned body to maintain articles on the carrier in a moist condition.

8. A device of the character described for heating articles of food, comprising an elongated tubular body open at each end and comprising an inner and an outer wall, said walls being spaced apart, means for closing the space between said walls at each end of the body, supporting means for the body, a heating element within the space between said walls, a shiftable closure overlying one end of the body, an elongated tray like member adapted to be inserted into the body from the other end thereof and formed to close the said other end when fully inserted, and means for introducing steam into the interior of said body to moisten articles carried by said member.

9. A device of the character described for heating articles of food, comprising an elongated tubular body open at each end and comprising an inner and an outer wall, said walls being spaced apart, means for closing the space between said walls at each end of the body, supporting means for the body, a heating element within the space between said walls, a shiftable closure overlying one end of the body, an elongated tray like member adapted to be inserted into the body from the other end thereof and formed to close the said other end when fully inserted, a steam generating device, and a pipe connection leading from said steam generating device to the interior of said body.

In testimony whereof I hereunto affix my signature.

WILLIAM H. RITTBERGER.